United States Patent
Tsai et al.

(10) Patent No.: US 11,594,041 B2
(45) Date of Patent: *Feb. 28, 2023

(54) OBSTACLE DETECTION IN ROAD SCENES

(71) Applicant: NEC Laboratories America, Inc., Princeton, NJ (US)

(72) Inventors: Yi-Hsuan Tsai, Santa Clara, CA (US); Kihyuk Sohn, Fremont, CA (US); Buyu Liu, Cupertino, CA (US); Manmohan Chandraker, Santa Clara, CA (US); Jong-Chyi Su, Amherst, MA (US)

(73) Assignee: NEC Corporation

(*) Notice: Subject to any disclaimer, the term of this patent is extended or adjusted under 35 U.S.C. 154(b) by 178 days.

This patent is subject to a terminal disclaimer.

(21) Appl. No.: 17/128,492

(22) Filed: Dec. 21, 2020

(65) Prior Publication Data

US 2021/0110178 A1 Apr. 15, 2021

Related U.S. Application Data

(63) Continuation-in-part of application No. 16/535,681, filed on Aug. 8, 2019, now Pat. No. 10,915,792.

(51) Int. Cl.
*G06K 9/00* (2022.01)
*G06V 20/58* (2022.01)
(Continued)

(52) U.S. Cl.
CPC ............. *G06V 20/58* (2022.01); *B60W 10/18* (2013.01); *B60W 10/20* (2013.01); *B60W 30/09* (2013.01); *B60W 30/0956* (2013.01); *B60W 50/0097* (2013.01); *G06K 9/6259* (2013.01); *G06K 9/6261* (2013.01); *G06N 3/0454* (2013.01); *G06N 3/08* (2013.01); *G08G 1/166* (2013.01); *B60W 2420/42* (2013.01); *B60W 2554/4026* (2020.02); *B60W 2554/4029* (2020.02); *B60W 2555/20* (2020.02)

(58) Field of Classification Search
USPC ........................................................ 382/157
See application file for complete search history.

(56) References Cited

U.S. PATENT DOCUMENTS

2021/0064883 A1* 3/2021 Sharma ................... G06V 10/82
2021/0201159 A1* 7/2021 Song ....................... G06N 3/088

OTHER PUBLICATIONS

Wen, Jun, et al. "Bayesian uncertainty matching for unsupervised domain adaptation." arXiv preprint arXiv:1906.09693 (2019). (Year: 2019).*

(Continued)

*Primary Examiner* — Jonathan S Lee
(74) *Attorney, Agent, or Firm* — Joseph Kolodka

(57) ABSTRACT

Systems and methods for obstacle detection are provided. The system aligns image level features between a source domain and a target domain based on an adversarial learning process while training a domain discriminator. The target domain includes one or more road scenes having obstacles. The system selects, using the domain discriminator, unlabeled samples from the target domain that are far away from existing annotated samples from the target domain. The system selects, based on a prediction score of each of the unlabeled samples, samples with lower prediction scores. The system annotates the samples with the lower prediction scores.

20 Claims, 8 Drawing Sheets

(51) Int. Cl.
  *G06K 9/62* (2022.01)
  *B60W 30/095* (2012.01)
  *B60W 30/09* (2012.01)
  *B60W 10/18* (2012.01)
  *B60W 10/20* (2006.01)
  *G08G 1/16* (2006.01)
  *B60W 50/00* (2006.01)
  *G06N 3/08* (2023.01)
  *G06N 3/04* (2023.01)

(56) References Cited

OTHER PUBLICATIONS

Liang, Jian, et al. "Exploring uncertainty in pseudo-label guided unsupervised domain adaptation." Pattern Recognition 96 (2019): 106996. (Year: 2019).*

Chen, Yi-Hsin, et al. "No. more discrimination: Cross city adaptation of road scene segmenters." Proceedings of the IEEE International Conference on Computer Vision. 2017. (Year: 2017).*

Tsai, Yi-Hsuan, et al. "Learning to adapt structured output space for semantic segmentation." Proceedings of the IEEE conference on computer vision and pattern recognition. 2018. (Year: 2018).*

Hoffman, Judy, et al. "Cycada: Cycle-consistent adversarial domain adaptation." International conference on machine learning. Pmlr, 2018. (Year: 2018).*

Chen et al, "Domain Adaptive Faster R-CNN for Object Detection in the Wild", CVPR, Mar. 2018, pp. 3339-3348.

Inoue et al., "Corss-Domain Weakly-Supervised Object Detection Through Progressive Domain Adaptation", CVPR, Mar. 2018, pp. 5001-5009.

Jong-Chyi Sui et al "Active Adversarial Domain Adaptation", arXiv1904.07848v1, Apr. 16, 2019 (retrieved from https://arxiv.org/abs/1904.07848), pp. 1-12.

* cited by examiner

OBSTACLE DETECTION IN ROAD SCENES

RELATED APPLICATION INFORMATION

This application is a Continuation-in Part of U.S. application Ser. No. 16/535,681, filed on Aug. 8, 2019. This application is related to an application entitled "Segmentation To Determine Lane Markings And Road Signs", having an application entitled "Human Detection in Scenes", having and an application entitled "Construction Zone Segmentation", having which are incorporated by reference herein in their entireties.

BACKGROUND

Technical Field

The present invention relates to domain management and more particularly to obstacle detection in road scenes.

Description of the Related Art

Road-scene images from two cities may vary significantly due to the different style of architectures and roads. In addition, images may be captured under various conditions such as weather and lighting environment even within the same city. Therefore, instance object detection and segmentation of images is known to require labor-intensive annotation process to train the fully supervised model in every domain.

SUMMARY

According to aspects of the present invention, a method is provided for obstacle detection. The method includes aligning image level features between a source domain and a target domain based on an adversarial learning process while training a domain discriminator. The target domain includes one or more road scenes having obstacles. The method further includes selecting, using the domain discriminator, unlabeled samples from the target domain that are furthest away from existing annotated samples from the target domain. The method also includes selecting, by a processor device, based on a prediction score of each of the unlabeled samples, samples with lower prediction scores. The method additionally includes annotating the samples with the lower prediction scores.

According to other aspects of the present invention, a computer system is provided for obstacle detection. The computer system includes a processor device operatively coupled to a memory device. The processor device is configured to align image level features between a source domain and a target domain based on an adversarial learning process while training a domain discriminator. The target domain includes one or more road scenes having obstacles. The processor device is further configured to select, using the domain discriminator, unlabeled samples from the target domain that are far away from existing annotated samples from the target domain. The processor device is also configured to select based on a prediction score of each of the unlabeled samples, samples with lower prediction scores. The processor device is additionally configured to annotate the samples with the lower prediction scores.

According to yet other aspects of the present invention, a computer program product is provided for domain adaptation. The computer program product includes a non-transitory computer readable storage medium having program instructions embodied therewith. The program instructions are executable by a computing device to cause the computing device to perform a method. The method includes aligning image level features between a source domain and a target domain based on an adversarial learning process while training a domain discriminator. The target domain includes one or more road scenes having obstacles. The method further includes selecting, using the domain discriminator, unlabeled samples from the target domain that are far away from existing annotated samples from the target domain. The method also includes selecting, by a processor device, based on a prediction score of each of the unlabeled samples, samples with lower prediction scores. The method additionally includes annotating the samples with the lower prediction scores.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
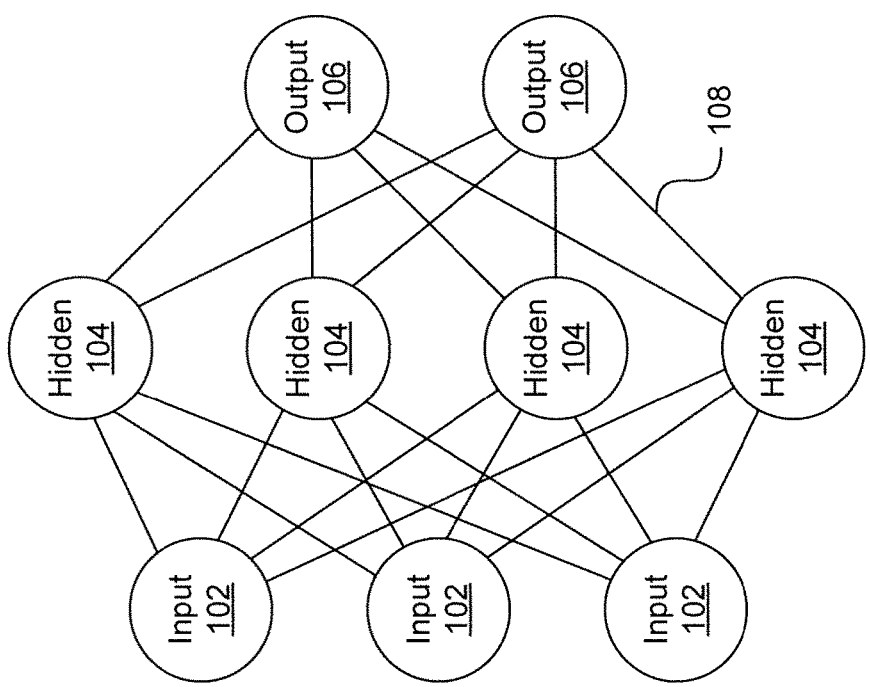
FIG. 1 is a generalized diagram of a neural network, in accordance with an embodiment of the present invention.

In accordance with embodiments of the present invention, systems and methods are provided for obstacle detection in road scenes. The system applies an adversarial loss function to encourage a distribution of labeled samples and unlabeled samples from a label set. The system selects higher diversity score unlabeled sample from the unlabeled samples. The higher diversity score unlabeled samples are unlabeled samples with higher diversity scores than other unlabeled samples. The system selects lower prediction score higher diversity score unlabeled samples from the higher diversity score unlabeled samples. The lower prediction score higher diversity score unlabeled samples are higher diversity score unlabeled samples with lower prediction scores than other higher diversity score unlabeled samples. The system annotates the lower prediction score higher diversity score unlabeled samples. The system updates the label set with annotated lower prediction score higher diversity score unlabeled samples to form an updated labeled set, and retrains a model using the updated label set. The model implements at least one predetermined task, for example, object detection and semantic segmentation.

In one embodiment, the system provides an active learning framework by using a domain discriminator to select unlabeled images that are far away from existing annotated images. As the domain adaptation and active learning processes continue, the domain discriminator becomes stronger to ensure that the selected images are diverse for annotations. In addition, the system combines a classifier score to further filter these images that have less confidence for prediction. After selecting the target images, the system annotates the selected target images and retrains the model in an iterative scheme.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

As described herein, the ANN 100 can implement instance object detection and segmentation based on input images, such as described below with respect to FIG. 6.

Figure 2:
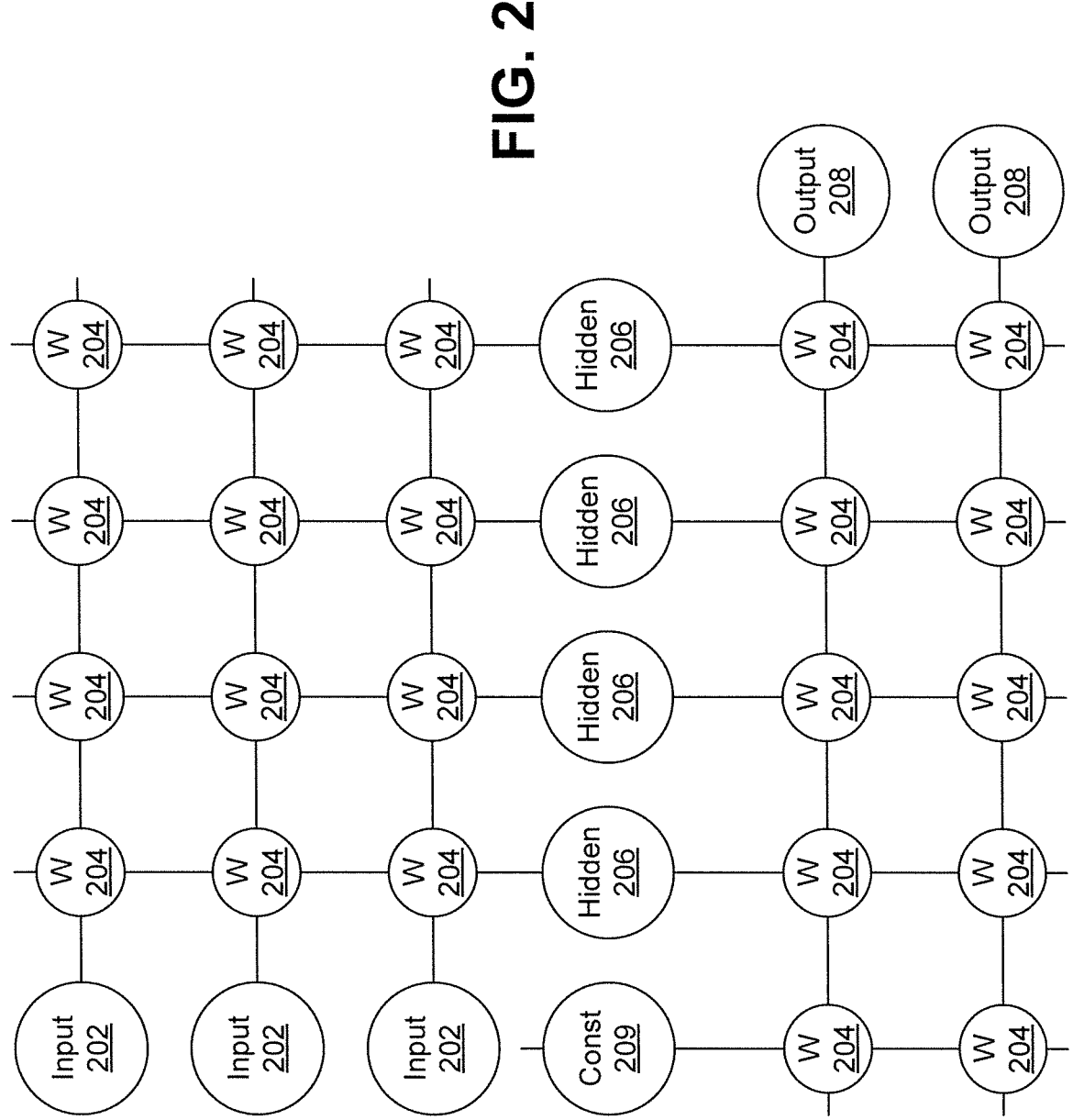
FIG. 2 is a diagram of an artificial neural network (ANN) architecture, in accordance with an embodiment of the present invention.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

A convolutional neural networks (CNN) is a subclass of ANNs which has at least one convolution layer. A CNN consists of an input and an output layer, as well as multiple hidden layers. The hidden layers of a CNN consist of convolutional layers, rectified linear unit (RELU) layer (e.g., activation function), pooling layers, fully connected layers and normalization layers. Convolutional layers apply a convolution operation to the input and pass the result to the next layer. The convolution emulates the response of an individual neuron to visual stimuli.

CNNs can be applied to analyzing visual imagery. CNNs can capture local information (e.g., neighbor pixels in an image or surrounding words in a text) as well as reduce the complexity of a model (to allow, for example, faster training, requirement of fewer samples, and reduction of the chance of overfitting).

CNNs use a variation of multilayer perceptrons designed to require minimal preprocessing. CNNs are also known as shift invariant or space invariant artificial neural networks (SIANN), based on their shared-weights architecture and translation invariance characteristics. CNNs can be used for applications in image and video recognition, recommender systems, image classification, medical image analysis, and natural language processing. CNNs can be applied to implement instance object detection and segmentation based on input images, such as described herein below with respect to FIG. 3. The CNNs can also apply adversarial loss functions, as further described herein below with respect to FIGS. 3 and 4.

Figure 3:
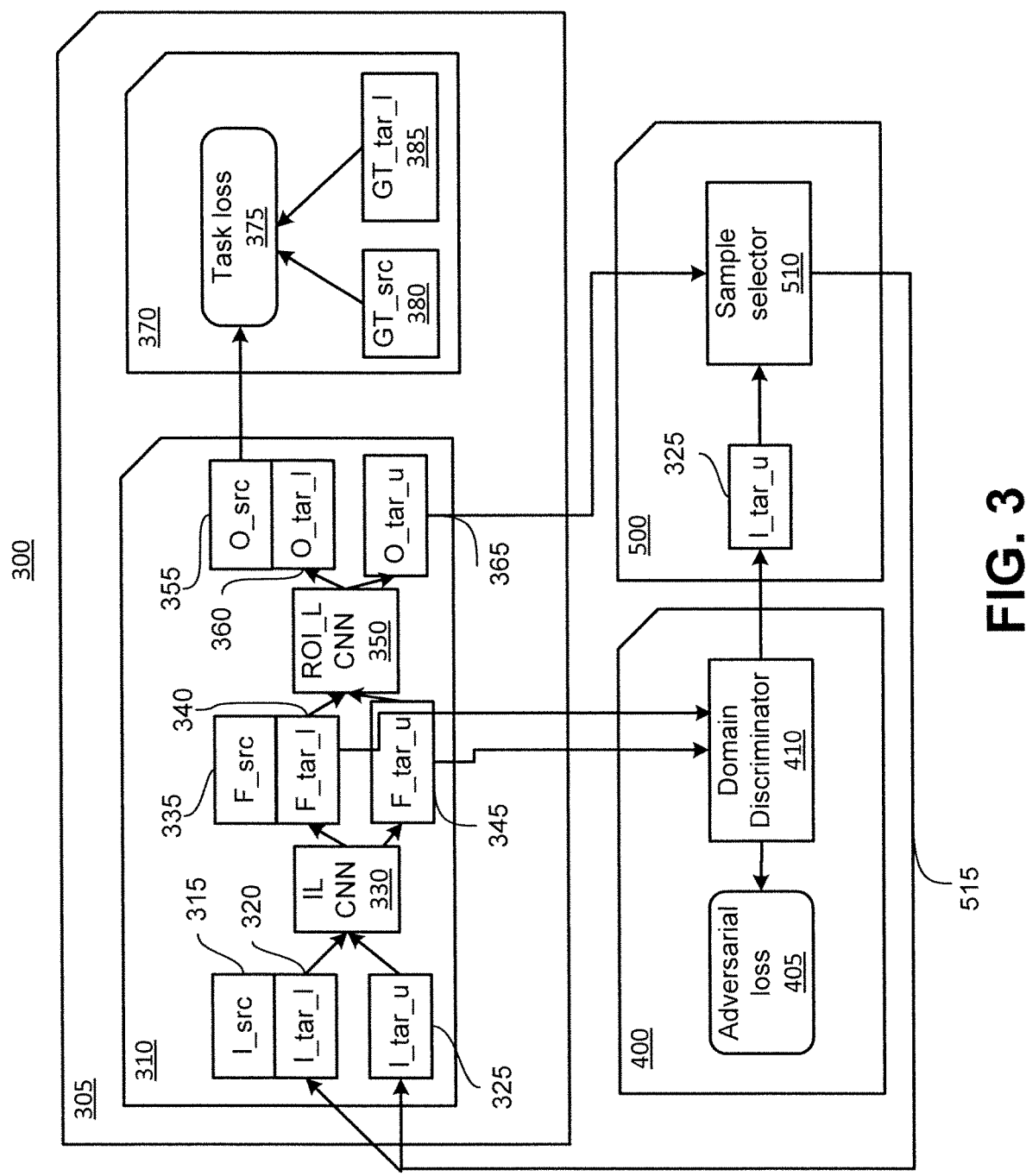
FIG. 3 is a block diagram illustrating a high-level system for semi-supervised domain adaptation for instance detection and segmentation, in accordance with an embodiment of the present invention.

Referring now to FIG. 3, a high-level system 300 for semi-supervised domain adaptation for instance detection and segmentation is illustratively depicted in accordance with an embodiment of the present invention.

In a system with semi-supervised domain adaptation, the system is able to acquire annotations for some (for example, a few) images from the target domain (and thereby provide a (for example, limited) measure of supervision). As shown in FIG. 3, system 300 includes main task system 305, a domain adaptation system 400 and an active learning system 500. Note that boxes with square edges denote data (for example, source (I_src), labeled target (I_tar_l), etc.) or computational units (or devices), such as convolutional neural networks (CNNs) or clustering. Rounded edge boxes denote loss functions (for example, task loss 375 and adversarial loss 405). Arrows indicate data flow.

The combination of the domain adaptation system 400 and the active learning system 500 provide a framework for jointly considering the diversity and uncertainty that are estimated by main task convolutional neural networks (CNNs) 310. The domain discriminator 410 implements domain transfer (for example, shift of knowledge with annotations) and provides a signal to efficiently select informative unlabeled target samples. By jointly considering the diversity and uncertainty that are estimated from the main task CNNs 310, the framework (provided by the domain adaptation system 400 and the active learning system 500) iteratively updates both the model prediction (via main task CNNs 310) and active learning (via the active learning system 500). Consequently, the example embodiments provide a framework which can achieve higher accuracy while annotating fewer samples. Note that the framework is general and can be also applied for various tasks (for example, semantic segmentation and fine-grained object recognition). The example embodiments achieve higher accuracy for object detection based on a limited budget for annotations in the target domain.

Main task CNNs 310, as shown in FIG. 3, receive input images. Main task CNNs 310 implement instance object detection and segmentation based on input images. The input images can come from two domains, denoted herein as source (I_src 315), labeled target (I_tar_l 320), and unlabeled target (I_tar_u 325). These inputs are then fed into the image-level CNN (IL CNN 330) to generate features (F_src 335, F_tar_l 340, and F_tar_u 345). A feature can include an edge, corners, interest points, blobs, regions of interest points, ridges, etc. Based on these features, the main task CNNs 310 propagate the features to the region of interest level (ROI-level) CNN (denoted in FIG. 3 as ROLL CNN 350) and generate output bounding boxes (O_src 355, O_tar_l 360, and O_tar_u 365) as the (for example, final) object detection results. A bounding box is the coordinates of the rectangular border that fully encloses a digital image when it is placed over a page, a canvas, a screen or other similar (for example, bi-dimensional) background. Note that main task CNNs 310 can also predict an instance segmentation map within each bounding box. Instance segmentation determines a pixel-wise mask for each object in an image even if the objects are of the same class label.

Main task loss function 370 trains the CNNs from main task CNNs 310. For images from the source domain and the labeled target domain, main task loss function 370 accesses (for example, is given, receives, etc.) ground truth labels (GT_src 380 and GT_tar_l 385), which are used in a standard supervised loss function (task loss 375) to train the main task CNNs 310. Ground truth refers to the accuracy of the training set's classification for supervised learning techniques and is used in statistical models by the main task CNNs 310 to prove or disprove hypotheses regarding images from the source domain. A loss function measures the inconsistency between a predicted value and an actual label.

Domain adaptation system 400 adapts domains (via a domain discriminator). In order to train the main task CNNs 310 and also handle images from the unlabeled target domain (I_tar_u 325), domain adaptation system 400 applies an adversarial loss 405 function (or regularization) to encourage the distribution of labeled samples (F_src 335 and F_tar_l 340) and unlabeled samples (F_tar_u) to be similar. This adversarial loss 405 function is computed based on a domain discriminator 410 that aims to distinguish between labeled and unlabeled samples for the domain alignment purpose. Domain adaptation system 400 solves (or resolves, etc.) the domain gap (for example, problem, issue, etc.) between two domains via aligning the image-level features (F_src 335 and F_tar_l 340) using an adversarial learning scheme. During this process, a domain discriminator 410 is adopted to distinguish whether the feature is from the source (labeled, for example, as 0) or the target (labeled, for example, as 1) domain.

When introducing a limited budget for annotations in the target domain, system 300 aims to select informative images that can improve the target performance efficiently, for example, annotating fewer images while achieving higher performance. Toward this end, system 300 implements an active learning framework by using the domain discriminator 410 to select unlabeled images that are far away from existing annotated images. As the domain adaptation and active learning processes continue, the domain discriminator 410 becomes stronger to ensure that the selected images are diverse for annotations.

Active learning system 500 implements active learning via sample selection. Given a limited budget to annotate unlabeled target images, active learning system 500 iteratively selects informative samples from the target domain for annotations. First, active learning system 500 uses the domain discriminator 410 from domain adaptation system 400 as an indicator to find a set of unlabeled target images that are diverse from the existing labeled samples. To achieve this, active learning system 500 applies the domain discriminator 410 on all the unlabeled samples (I_tar_u 325) and ranks the scores of the unlabeled samples. By selecting the unlabeled samples (I_tar_u 325) with higher scores, for example, far away from the labeled samples in the feature space, active learning system 500 ensures that these selected samples are different from existing labeled samples and thereby increases diversity among the samples.

After selecting unlabeled samples that are different from existing labeled samples as described above, active learning system 500 further uses their prediction scores (O_tar_u 365) from the main task CNNs 310 as confidence scores. Active learning system 500 then filter samples by selecting the samples with lower scores to account for the uncertainty.

By using these two criteria to select unlabeled samples (I_tar_u 325), active learning system 500 annotates the unlabeled samples and adds these newly annotated samples in the labeled set (I_tar_l 320) and re-trains the model. Active learning system 500 iteratively repeats this process by training CNNs (for example, main task CNNs 310) and the domain discriminator 410, in a manner that the diversity (for example, based on I_tar_u 325) and uncertainty (for example, confidence based on O_tar_u 365) are considered in each iteration. In other words, active learning system 500 combines the classifier score to further filter images that have less confidence for prediction. After selecting the target images, active learning system 500 annotates the selected target images and re-trains the model in an iterative scheme.

The domain discriminator 410 provides a cue for the sample selector 510 to better understand the distribution difference between labeled and unlabeled samples. Consequently, system 300 uses the cue in a key manner to obtain a small and informative set of samples while achieving better task performance (for example, than incumbent processes). Sample selector 510 provides (for example, sends 515) the sample annotation 515 to I_tar_l 320 and I_tar_u 325 (for example, as sample updates).

Figure 4:
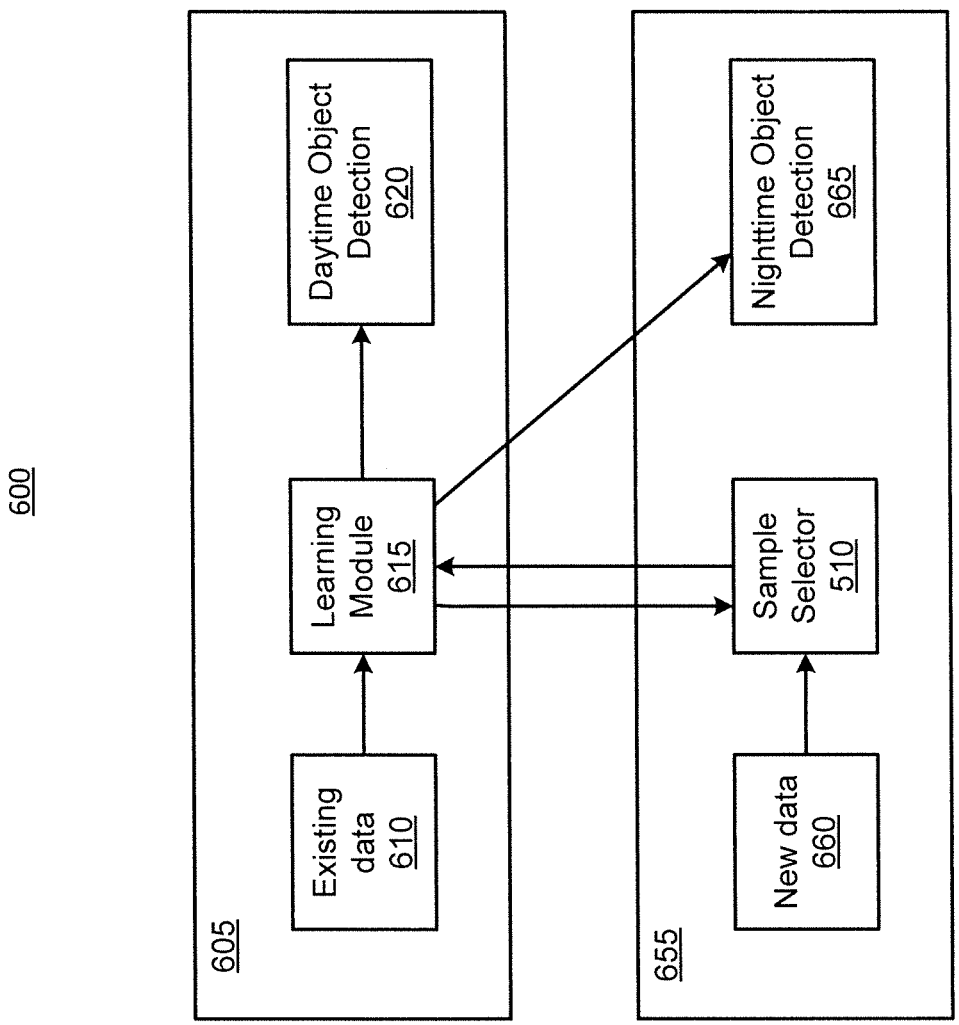
FIG. 4 is a block diagram illustrating an implementation of semi-supervised domain adaptation for instance detection and segmentation, in accordance with an embodiment of the present invention.

Referring now to FIG. 4, an implementation of semi-supervised domain adaptation for instance detection and segmentation is illustratively depicted in accordance with an embodiment of the present invention.

As shown in FIG. 4, the example embodiments are directed towards (for example, target) instance object detection and segmentation, which in incumbent implementations is known to require labor-intensive annotation process to train the fully supervised model in every domain. In contrast, the example embodiments address annotation bottlenecks by transferring the knowledge from one domain with full annotations to another domain with only a limited budget to annotate the ground truth for training the models.

For example, with respect to implementation 600, using similar methods as described with respect to system 300, learning module 615 can learn an object detection (for example, car, bike, and pedestrian) model using a large amount of existing data 610 (for example, training data) with annotations in the source domain 605 (for example, daytime images for daytime object detection 620). For the nighttime case (nighttime object detection 665), which can be more challenging than the daytime case, the sample selector 510 can use the daytime model to select informative data (new data 660) from the nighttime domain 655 for annotations (with a limited budget) and re-train the object detector (for example, nighttime object detection 665) to improve the performance during nighttime.

The example embodiments exploit a few images with annotations in the target domain, which is a practical setting when there is a limited budget available for annotations. The example embodiments provide an active learning technique for the semi-supervised domain adaptation for example, in instances in which only a limited budget available to annotate the target images, e.g., limited time and money.

The example embodiments provide a general framework that can be applied for various types of domains and tasks, for example for labor-intensive tasks such as object detection, semantic segmentation, and fine-grained object recognition.

Figure 5:
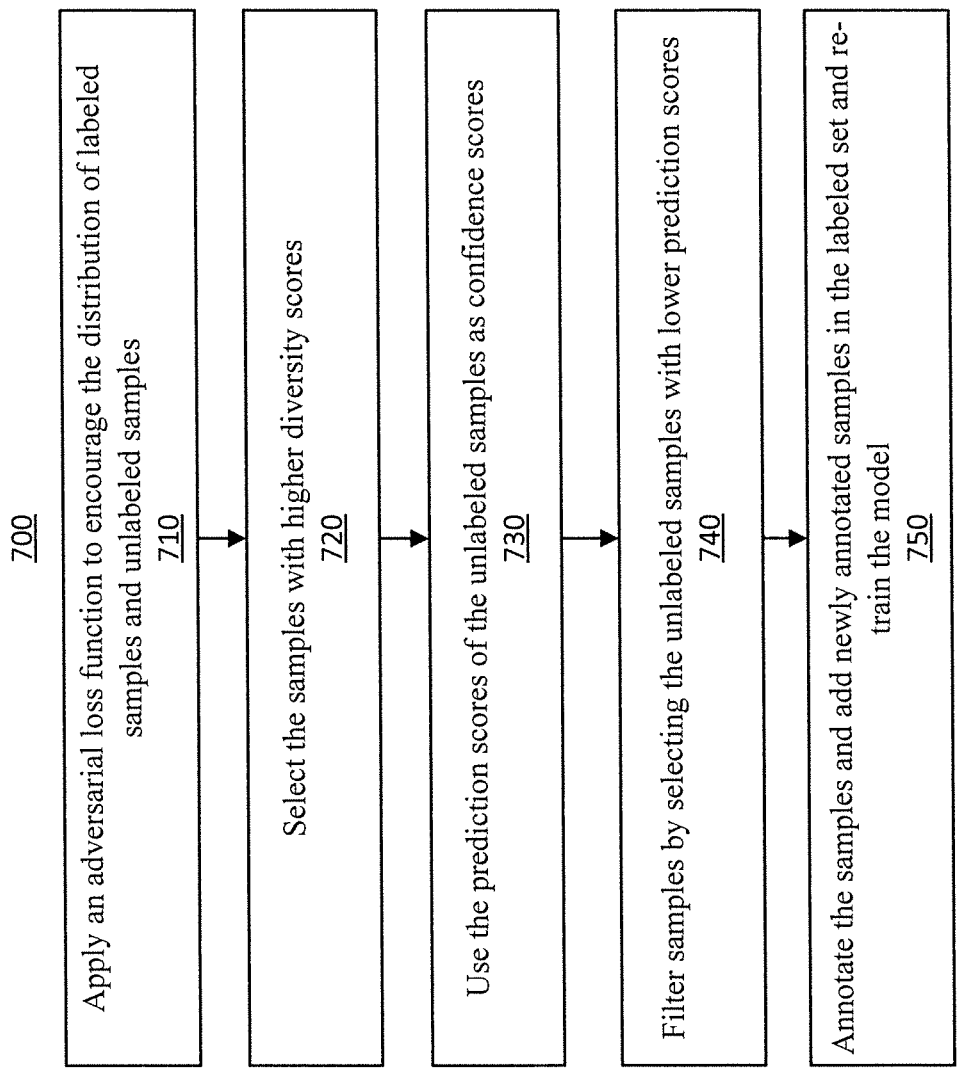
FIG. 5 is a flow diagram illustrating a method for semi-supervised domain adaptation for instance detection and segmentation, in accordance with the present invention.

Referring now to FIG. 5, a method 700 for semi-supervised domain adaptation for instance detection and segmentation is illustratively depicted in accordance with an embodiment of the present invention.

At block 710, system 300 applies an adversarial loss function to encourage the distribution of labeled samples and unlabeled samples. The samples are from a target domain. The system 300 also receives input samples (for example, images, videos, or other data forms such as texts) from a source domain. The source domain and the target domain can include images taken under different conditions, such as scene images from two cities, which vary significantly due to the different style of architectures and roads, two different geographical areas, two different lighting conditions, etc.

At block 720, system 300 selects the samples with higher diversity scores, (for example, far away from the labeled samples in the feature space) to ensure that these selected unlabeled samples are different from existing labeled samples.

At block 730, system 300 uses the prediction scores of the selected unlabeled samples from the main task CNNs 310 as confidence scores. System 300 then filters samples by selecting the unlabeled samples with lower prediction scores to account for the uncertainty (at block 740).

System 300 uses these two criteria (higher diversity scores and lower prediction scores) to select unlabeled samples. At block 750, system 300 annotates the samples and adds these newly annotated samples in the labeled set and re-trains the model. System 300 iteratively repeats this process by training CNNs and the domain discriminator, and thereby ensures that the diversity and uncertainly are considered in each iteration.

Figure 6:
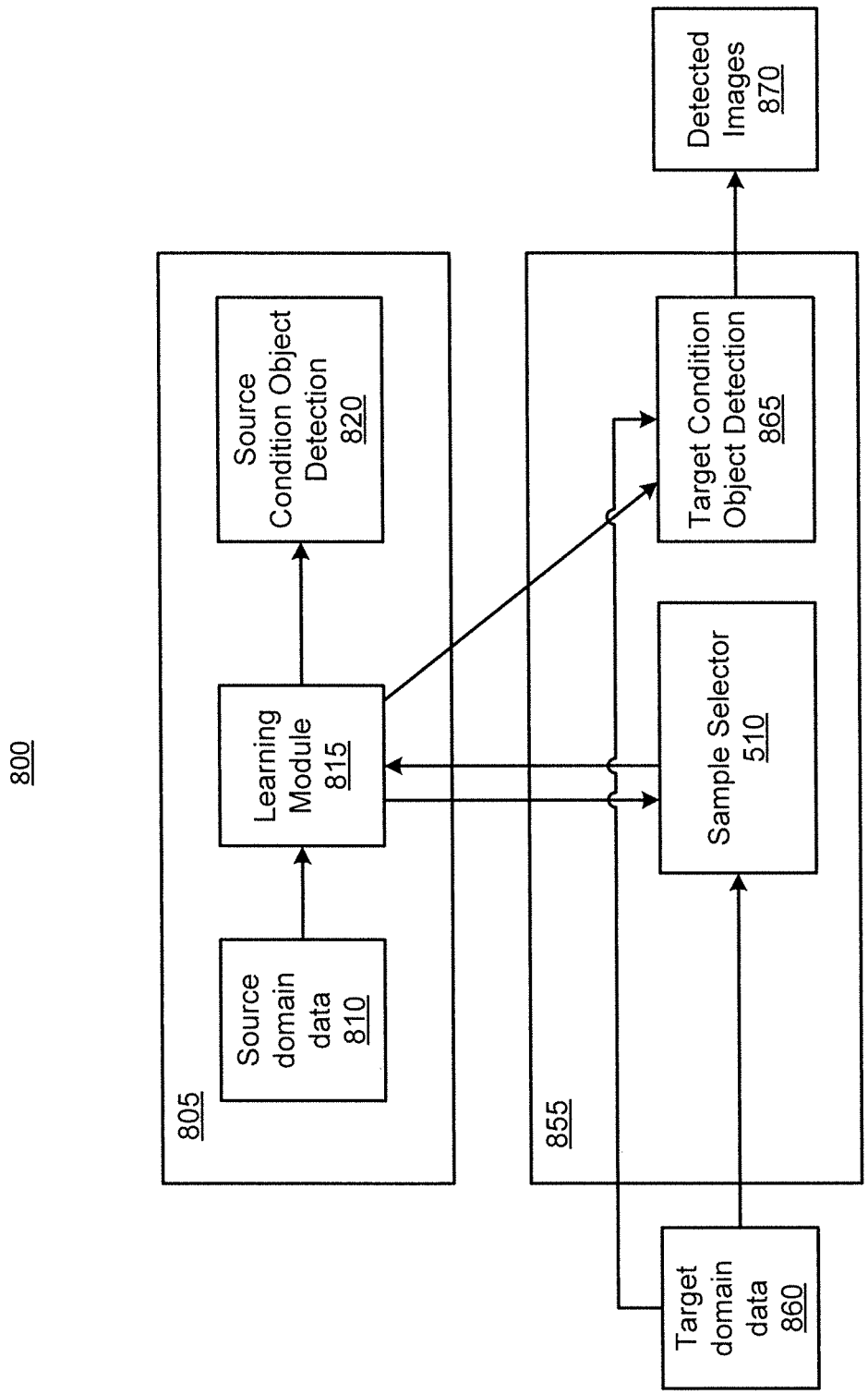
FIG. 6 is a block diagram illustrating an implementation of a system for semi-supervised domain adaptation for instance detection and segmentation, in accordance with an embodiment of the present invention.

Referring now to FIG. 6, an implementation of a device that includes a system for semi-supervised domain adaptation for instance detection and segmentation is illustratively depicted in accordance with an embodiment of the present invention.

As shown in FIG. 6, device 800 can include a camera or other image processing device that uses semi-supervised domain adaptation for instance detection and segmentation. According to an example embodiment, the semi-supervised domain adaptation for instance detection and segmentation can include an automatic process in which a camera is continuously collecting target images and selecting which data to annotate. The selected images can be sent to an associated device (or interface, etc.) for manual or semi-automatic annotation. Finally, annotated images are sent back to the semi-supervised domain adaptation device to automatically finetune the model. These processes can be parallelly and iteratively performed. For example, using similar methods as described with respect to system 300, learning module 815 can learn an object detection model using a large amount of source domain data 810 with annotations in the source domain 805 (for example, images detected with source conditions (for example, particular weather, geographic, etc.) for source condition object detection 820). The source condition and the target condition can be related (for example, different weather condition) in a way that object detection and annotation is more easily accomplished in the source domain.

For target condition object detection 865, which can be more challenging than the daytime case, the sample selector 510 can use the source domain model to select informative data (target domain data 860) from the target domain 855 for annotations (with a limited budget) and re-train the object detector (for example, target domain object detection 865) to improve the performance when the target conditions are present. Later, the target condition object detection 865 can receive images captured under the target conditions. The object detector (target domain object detection 865) can detect and annotate images 870 (for example, from the target domain data 860) based on the training from learning module 815.

Thus, the example embodiments can assist systems that use imaging data from different domains, such as advanced driver-assistance systems (ADAS) and fine-grained object recognition systems, in an active learning fashion that continuously learns from the new data. Similarly, other scenarios such as weather conditions, lighting conditions and cross-city cases can be analyzed and transfer of knowledge from one domain with full annotations to another domain with only a limited budget can be inexpensively (and/or cost effectively) implemented by applying the same methodology.

Figure 7:
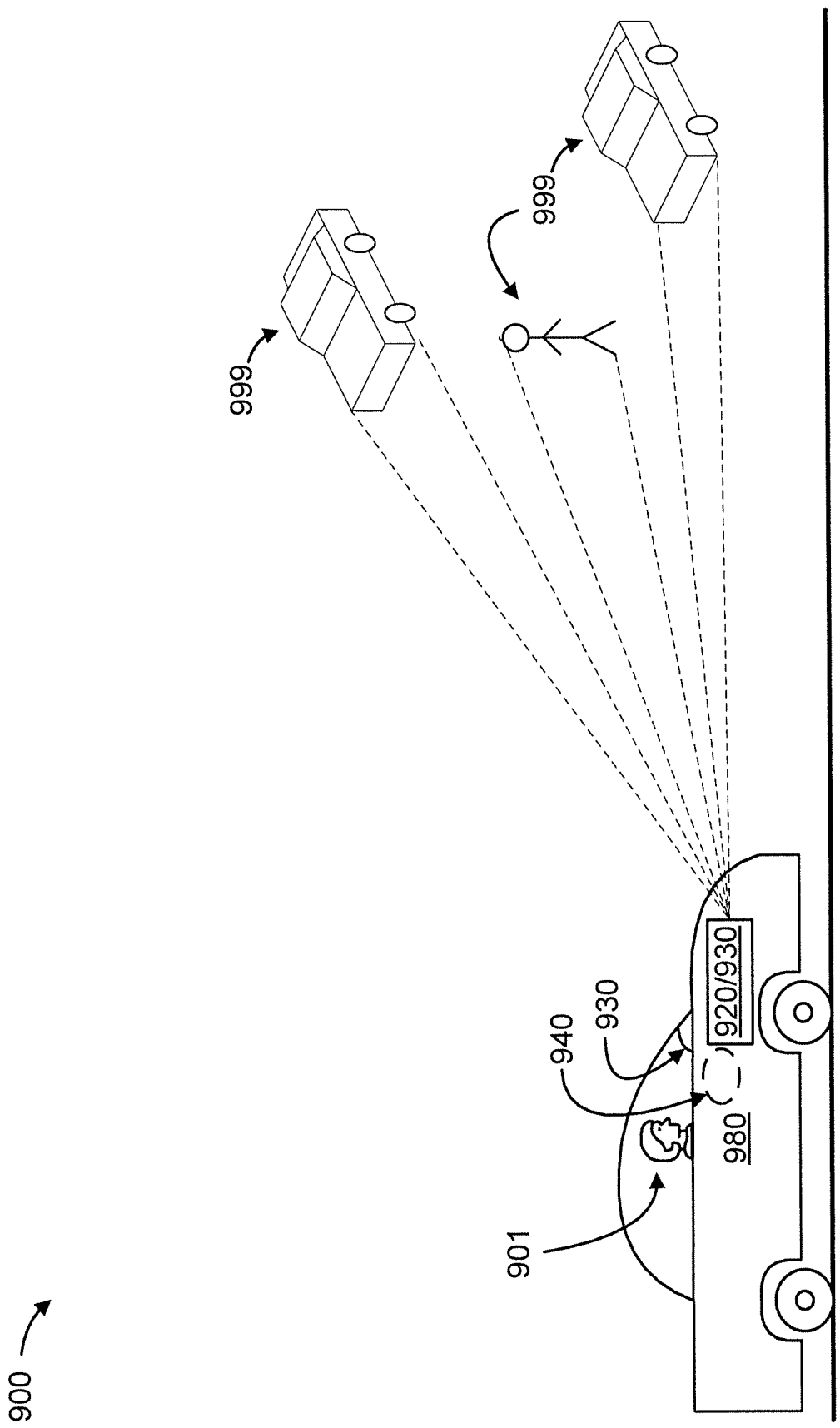
FIG. 7 is a block diagram showing an exemplary obstacle detection system, in accordance with an embodiment of the present invention.

FIG. 7 is a block diagram showing an exemplary obstacle detection system 900, in accordance with an embodiment of the present invention.

The system 900 includes a camera 920. While a single camera 920 is shown in FIG. 7 for the sakes of illustration and brevity, it is to be appreciated that multiple cameras can be also used, while maintaining the spirit of the present invention.

In the embodiment of FIG. 9, the camera 920 is mounted in a vehicle 980 for the purpose of capturing road scene images. The road scenes are evaluated for obstacle detection.

In the environment 900, a user 901 is located in a road scene with multiple objects 999, each having their own locations and trajectories. The user 901 is operating the vehicle 980.

The system 900 further includes a server 910 operatively coupled to the camera 920 and a display 930 and an audio system 940 of the vehicle 980. The server 910 can be configured to perform obstacle detection in road scenes. The server 910 includes a processor, a memory, and a wireless transceiver. The processor and the memory of the remove server are configured to perform obstacle detection based on images received from the camera 920 by the (the wireless transceiver of) the remote server 920. In another embodiment, the camera 920 is hardwired to the server 910. Hence, the processor and memory can be configured to include components for obstacle detection. In this way, a road scene can be evaluated to detect obstacles 999 which can then be displayed on the display 930 or announced by the audio system 940 to alert a user 901.

The server 910 may interface with the user through one or more systems of the vehicle 980 that the user is operating. For example, the server 910 can provide the user information through a system (e.g., a display system 930, a speaker system 940, and/or some other system) of the vehicle 980. Moreover, the system of the present invention may interface with the vehicle 980 itself (e.g., through one or more systems of the vehicle 980 including, but not limited to, a steering system, a braking system, an acceleration system, a steering system, etc.) in order to control the vehicle or cause the vehicle 980 to perform one or more actions. In this way, the user or the vehicle 980 itself can navigate around these objects 999 to avoid potential collisions there between.

Figure 8:
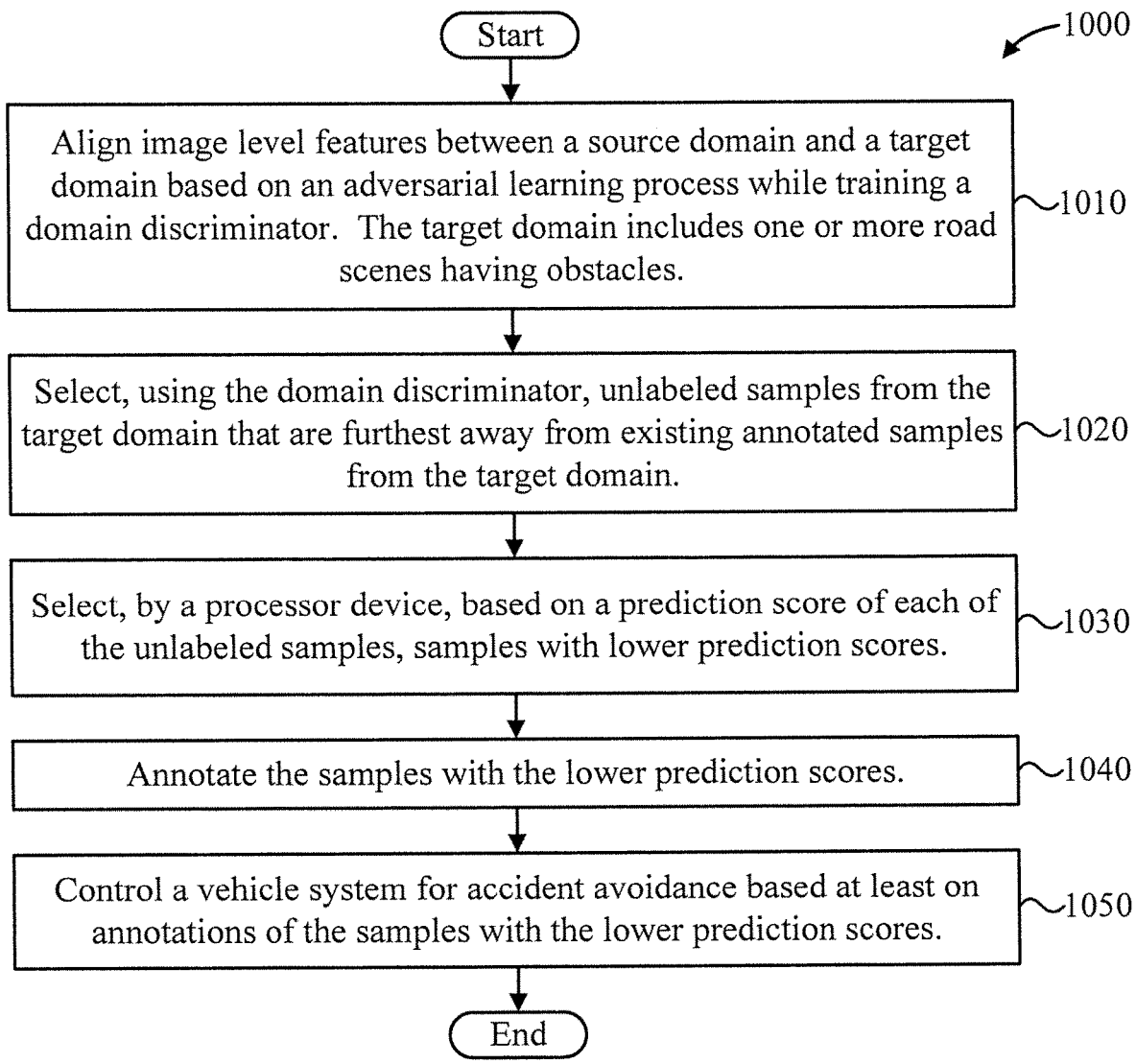
FIG. 8 is a flow diagram showing an exemplary obstacle detection method, in accordance with an embodiment of the present invention.

FIG. 8 is a block diagram showing an exemplary obstacle detection method 1000, in accordance with an embodiment of the present invention.

At block 1010, align image level features between a source domain and a target domain based on an adversarial learning process while training a domain discriminator. The target domain includes one or more road scenes having obstacles.

At block 1020, select, using the domain discriminator, unlabeled samples from the target domain that are furthest away from existing annotated samples from the target domain.

At block 1030, select, by a processor device, based on a prediction score of each of the unlabeled samples, samples with lower prediction scores.

At block 1040, annotate the samples with the lower prediction scores.

At block 1050, control a vehicle system for accident avoidance based at least on annotations of the samples with the lower prediction scores. The vehicle system can be selected from, for example, a vehicle accelerating system, a vehicle braking system, and a vehicle steering system. The vehicle control system is retrained by adding the newly annotated samples to the training set, whereby performance is now additionally improved for the road situations represented by those samples.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for obstacle detection, comprising:
    aligning image level features between a source domain and a target domain based on an adversarial learning process while training a domain discriminator, the target domain including one or more road scenes having obstacles;
    selecting, using the domain discriminator, unlabeled samples from the target domain that are furthest away from existing annotated samples from the target domain;
    selecting, by a processor device, based on a prediction score of each of the unlabeled samples, samples with lower prediction scores; and
    annotating the samples with the lower prediction scores.

2. The method as recited in claim 1, further comprising:
    iteratively retraining a model that annotates the unlabeled samples based on the annotated samples with the lower prediction scores, wherein the model implements at least one predetermined task.

3. The method as recited in claim 2, wherein the at least one predetermined task includes at least one of instance object detection and segmentation.

4. The method as recited in claim 2, wherein retraining the model further comprises:
    inputting an updated label set including the annotated samples with the lower prediction scores into an image-level convolutional neural network (CNN) to generate at least one feature;
    based on the at least one feature, propagating the updated label set to a region of interest level (ROI-level) CNN; and
    generating output bounding boxes as at least one object detection.

5. The method as recited in claim 1, wherein aligning the image level features between the source domain and the target domain based on the adversarial learning process further comprises:
    applying an adversarial loss function to encourage a distribution of labeled samples and the unlabeled samples from a label set;
    selecting, by the processor device, at least one higher diversity score unlabeled sample from the unlabeled samples; and
    selecting at least one lower prediction score higher diversity score unlabeled sample from the at least one higher diversity score unlabeled sample.

6. The method as recited in claim 5, further comprising:
    predicting an instance segmentation map within each bounding box.

7. The method as recited in claim 5, further comprising:
    annotating the at least one lower prediction score higher diversity score unlabeled sample; and
    updating the label set with at least one annotated lower prediction score higher diversity score unlabeled sample to form an updated labeled set.

8. The method as recited in claim 5, wherein selecting the at least one lower prediction score higher diversity score unlabeled sample from the unlabeled samples further comprises:
    using prediction scores of the unlabeled samples as confidence scores.

9. The method as recited in claim 1, wherein the source domain and the target domain are selected from at least one of different geographical areas, different weather conditions and different lighting conditions.

10. The method as recited in claim 1, further comprising controlling a vehicle system for accident avoidance based at least on annotations of the samples with the lower prediction scores.

11. The method as recited in claim 1, wherein the vehicle system is selected from the group consisting of a vehicle accelerating system, a vehicle braking system, and a vehicle steering system.

12. A computer system for obstacle detection, comprising:
    a processor device operatively coupled to a memory device, the processor device being configured to:
    align image level features between a source domain and a target domain based on an adversarial learning process while training a domain discriminator, the target domain including one or more road scenes having obstacles;
    select, using the domain discriminator, unlabeled samples from the target domain that are far away from existing annotated samples from the target domain;
    select based on a prediction score of each of the unlabeled samples, samples with lower prediction scores; and
    annotate the samples with the lower prediction scores.

13. The system as recited in claim 12, wherein the processor device is further configured to:
    iteratively retrain a model that annotates the unlabeled samples based on the annotated samples with the lower prediction scores, wherein the model implements at least one predetermined task.

14. The system as recited in claim 13, wherein the at least one predetermined task includes at least one of instance object detection and segmentation.

15. The system as recited in claim 13, wherein, when retraining the model, the processor device is further configured to:
   input an updated label set including the annotated samples with the lower prediction scores into an image-level convolutional neural network (CNN) to generate at least one feature;
   based on the at least one feature, propagate the updated label set o a region of interest level (ROI-level) CNN; and
   generate output bounding boxes as at least one object detection.

16. The system as recited in claim 15, wherein the processor device is further configured to:
   predict an instance segmentation map within each bounding box.

17. The system as recited in claim 13, wherein, when aligning the image level features between the source domain and the target domain based on. the adversarial learning process, the processor device is further configured to:
   apply an adversarial loss function to encourage a distribution of labeled samples and the unlabeled samples from a label set;
   select at least ore higher diversity score unlabeled sample from the unlabeled samples; and
   selecting at least one lower prediction score higher diversity score unlabeled sample from the at least one higher diversity score unlabeled sample.

18. The system as recited in claim 12, wherein the source domain and the target domain are selected from at least one of different geographical areas, different weather conditions and different lighting conditions.

19. The system as recited in claim wherein the processor device is further configured to:
   use a supervised loss function and ground truth labels from the source domain and the target domain to train at least one image-level convolutional neural network (CNN).

20. A computer program product for obstacle detection, the computer program product comprising a non-transitory computer readable storage medium having program instructions embodied therewith, the programstructions executable by a computing device to cause the computing device to perform the method comprising:
   aligning image level features between a source domain and a target domain based on an adversarial learning process while training a domain discriminator, the target domain including one or more road scenes having obstacles;
   selecting, using the domain discriminator, unlabeled samples from the target domain that are far away from existing annotated samples from the target domain;
   selecting, by a processor device, based on a prediction score of each of the unlabeled samples, samples with lower prediction scores; and
   annotating the samples with the lower prediction scores.

* * * * *